Feb. 25, 1936.　　　E. C. HORTON ET AL　　　2,032,319
WINDSHIELD CLEANER
Filed June 3, 1932　　　2 Sheets-Sheet 1
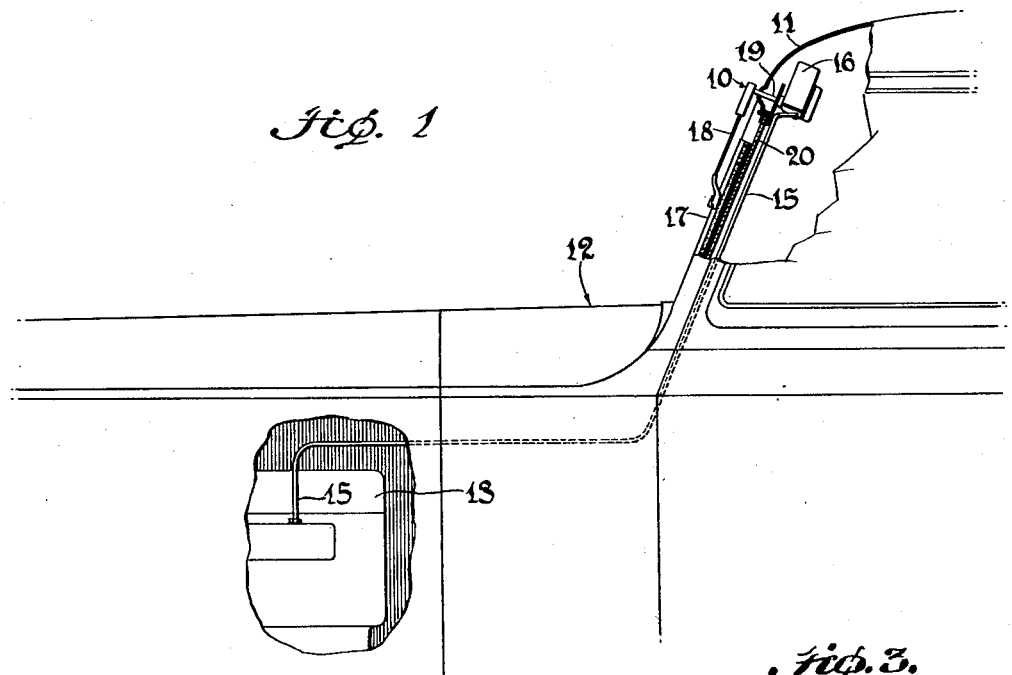
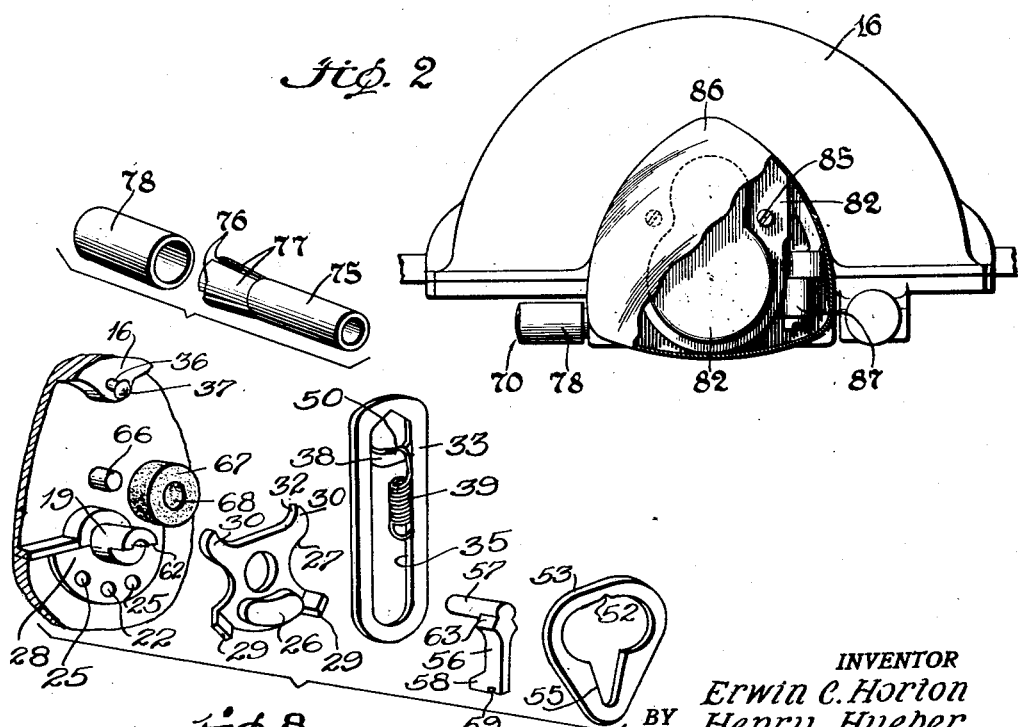
INVENTOR
Erwin C. Horton
Henry Hueber
BY Bean & Brooks
ATTORNEY Feb. 25, 1936.  E. C. HORTON ET AL  2,032,319
WINDSHIELD CLEANER
Filed June 3, 1932  2 Sheets-Sheet 2
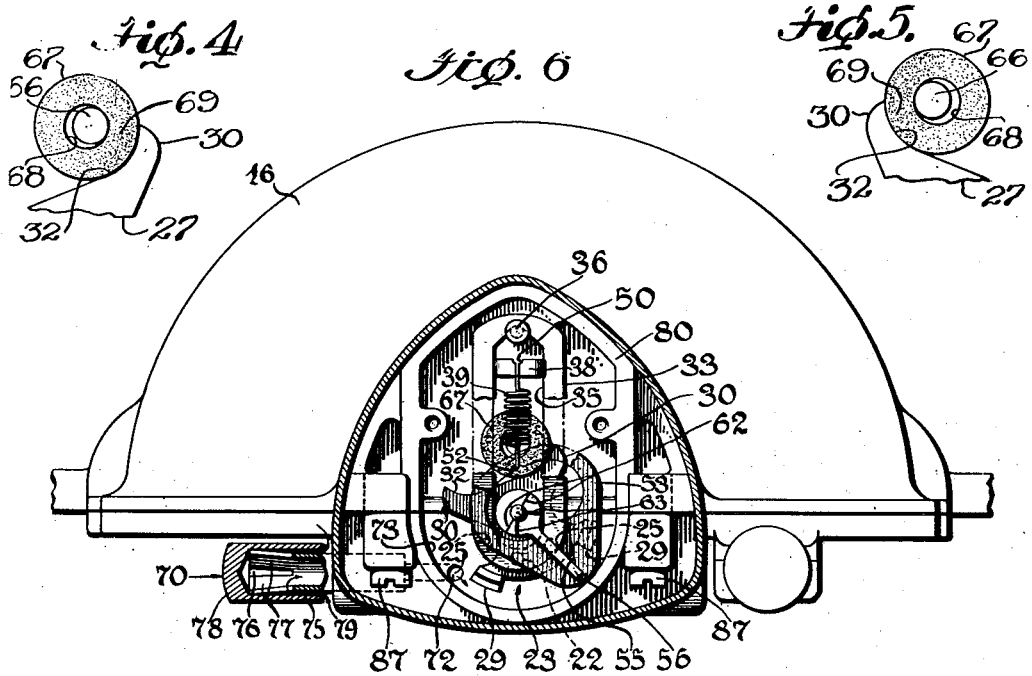
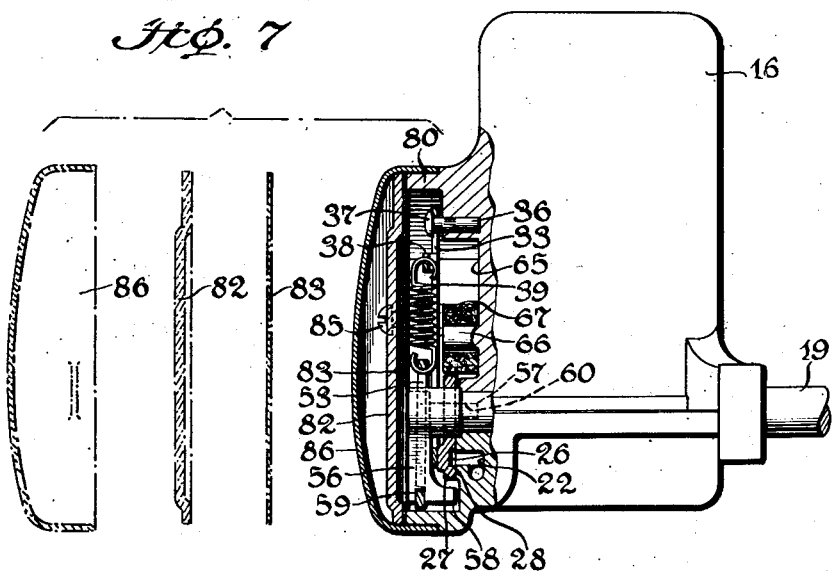
INVENTOR
Erwin C. Horton
BY Henry Hueber
Beau & Brooks   ATTORNEY Patented Feb. 25, 1936

2,032,319

UNITED STATES PATENT OFFICE 2,032,319

WINDSHIELD CLEANER

Erwin C. Horton, Hamburg, and Henry Hueber, Buffalo, N. Y., assignors to Trico Products Corporation, Buffalo, N. Y.

Application June 3, 1932, Serial No. 615,249

3 Claims. (Cl. 121—97)

This invention relates to windshield cleaners and it has particular relation to suction operated windshield cleaners for operation in conjunction with the manifolds of internal combustion engines.

One object of the invention is to provide a windshield cleaner which is substantially silent in its operation.

Another object of the invention is to provide a windshield cleaner in which sound deadening means are included in the mounting of various movable elements thereof to produce a substantially silently operating cleaner.

Another object of the invention is to provide a suction type windshield cleaner in which various suction operated elements are insulated against the generation of sound and in which the passage of air into or out of the various parts of the motor during its operation is muffled to prevent sounds ordinarily caused by air being forced under pressure through the windshield cleaner passages.

In the drawings:

Fig. 1 is a fragmentary diagrammatic view of a motor vehicle and a windshield cleaner mounted thereon.

Fig. 2 is an elevation of a cleaner motor having parts broken away for the sake of clearness.

Fig. 3 is an exploded perspective of an air intake muffler.

Fig. 4 is a fragmentary elevation, on a larger scale, showing in detail an insulating and silencing ring in one extreme position of operation of the cleaner motor.

Fig. 5 is a fragmentary elevation similar to Fig. 3 and illustrating the parts of the motor in the opposite position to that shown in Fig. 3.

Fig. 6 is an elevation of a cleaner motor with portions omitted for the purpose of exposing valve operating mechanism.

Fig. 7 is a side elevation partially in section, illustrating in disassembled relation, portions of chamber sections for enclosing the valve operating mechanism.

Fig. 8 is an exploded perspective view of the valve operating mechanism.

In practicing the invention a windshield cleaner 10 is mounted in an upper body portion 11 of a motor vehicle 12 that has an internal combustion engine 13 mounted therein for communication with the cleaner by means of a suction tube 15 connected to the suction side of the engine and extending along the vehicle frame to a cleaner motor 16. A wiper blade 17, connected to the motor by means of a wiper arm 18 and shaft 19 and mounted in a vehicle frame, is oscillatable upon a windshield 20 carried in the vehicle in a conventional manner. The suction tube 15 is in open communication with a duct 22, and a valve mechanism 23 provides for alternate exhausting of air from opposite sides of the motor. A pair of ducts 25 disposed on opposite sides of the duct 22 alternately communicate in air tight relation with a chamber 26 in a valve plate 27 and with the duct 22. This valve plate is rotatably mounted upon the motor shaft 19 and the chamber 26 is always in direct communication with the duct 22. The portion of the valve plate surrounding the chamber fits closely upon a valve seat 28 formed on the cleaner motor wall. A pair of lugs 29 integral with the valve plate 27 are disposed radially with respect to the axis of rotation of the valve plate and they are also disposed in offset relation with respect to the surface of the valve plate. Likewise a pair of fingers 30 having curved surfaces 32 are disposed radially and integrally of the valve plate and substantially diametrically opposite the respective lugs 29.

An oblong pressure plate 33 has a relatively long central slot 35 therein that provides for loosely fitting one of its end portions about the shaft 19, and the other end portion of the pressure plate is hooked over a pin 36 that is secured in the wall of the cleaner motor 16. The outer end of the pin is provided with a head 37 which prevents the plate from being displaced. A relatively narrow bridge 38 integral with the pressure plate traverses the slot 35 adjacent the end thereof that engages the pin 36 and it is offset from the mean surface of the plate. One end of a coil spring 39 is anchored in a notch 50 of the bridge, and the other end is anchored in a similar notch 52 of a link 53 that has a V-shaped notch 55 diametrically opposite the notch 52. The link sides are bowed or curved outwardly to provide sufficient space for lateral movement with respect to the shaft 19 which extends through the link. The end portion of the pressure plate 33 opposite the pin 36 bears against the valve 27 under the force exerted by the spring 39 in tending to tilt the plate by reason of its connection to the offset bridge 38. This spring is normally under tension.

A kicker 56 having a pintle 57 extending integrally at right angles from one end thereof is also provided with an integral lug 58 extending in the same direction from the other end, and has a notch 59 in its other or outer end in which the portion of the link 53 defining the V-notch 55 is disposed. The pintle is rotatably mounted in a socket 60 extending axially in the end portion of the shaft 19. Radial shoulders 62 which also extend axially of the shaft a distance equal substantially to the thickness of the kicker 56 are formed upon the end portion of the shaft 19 and coacting shoulders 63 formed on the inner end portion of the kicker impinge alternately upon the shoulders 62 when the kicker is oscillated by the shaft. During the oscillation of the shaft, the kicker lug 58 also alternately strikes and moves the lugs 29 for the purpose of alternately establishing communication through the duct 22 and one of the ducts 25.

Copending application of Henry Hueber, Serial No. 611,744, filed May 16, 1932, for Windshield cleaner valve action, includes a detailed showing of members corresponding to the pressure plate 33, link 53 and kicker 56 of the valve mechanism.

The portion of the cleaner motor wall between the shaft 19 and the pin 36 has a recess 65 therein in which a stud 66 is disposed as an integral portion of the motor wall. A cushioning sleeve 67 composed of yieldable material such as felt, leather, rubber, fabric or the like, has a central opening 68 materially larger than the diameter of the stud 66 and is mounted upon the latter in the path of oscillatory movement of the valve fingers 30. When the kicker is oscillated by the shaft 19 and strikes one of the lugs 29 the opposite finger is thrown against the sleeve 67 as shown in Figs. 4 and 5. It will be observed that the material of the sleeve is slightly compressed, as indicated by the darker stippled portions 69 thereof, and that movement of sleeve is slightly rotative as pressure is applied thereof by the fingers 30. Since the material of the sleeve is relatively soft and yieldable as well as being loosely mounted upon the stud 66, it is apparent that the clicking noise of the valve mechanism parts in snapping the kicker from one position of oscillation to the other is efficiently minimized. Also the V-shaped sides of the link defining the notch 55 are so inclined that one V-wall lies along the side of the kicker. Further movement of the kicker in a counter-clockwise direction, as viewed in Fig. 6, by reason of this arrangement, tends to pivot this V-shaped portion of the link about the pintle 57, and hence, tends to increase the tension upon the spring 39. It is apparent that the V-walls of the notch 55 progressively contact the sides of the kicker as the shaft is oscillated. Therefore, the noise of snapping the kicker in opposite directions in this operation is practically obviated. Likewise the fingers 30 engaging the yieldable sleeve aid in minimizing the noise which might be caused by the operation of this portion of the valve structure.

During the operation of the cleaner, air is exhausted from the motor 16 and air from the atmosphere is admitted through a muffler 70 and through a duct 72 communicating therewith and into a normally otherwise closed valve chamber 73. The muffler comprises a nipple 75 having a plurality of slots 76 extending from its extremity inwardly to form spaced fingers 77 that are spread or flared outwardly. A movable cap 78 fits over the fingers and its inner diameter is larger than, and hence its surface is spaced from, the outer surface of the nipple to form air inlet passage 79. The fingers are slightly contracted by forcing the cap thereon and resiliently maintain the cap in its proper position. The air from the atmosphere entering the duct 72 is distributed entirely around the circumference of the nipple and cap, and hence its entrance is substantially noiseless.

A wall 80 integral with the motor, surrounds the valve mechanism, and together with a cover or closure 82 fitted over the wall, constitutes an enclosing structure for the valve chamber 73. A fibrous gasket 83 is disposed between the closure 82 and the wall 80 and suitable screws 85 secure the latter firmly in place. An additional cap 86 of substantially triangular shape, with the corners of the triangular configuration rounded, is snapped or sprung over the wall 80 and cover 82. As best shown in Fig. 6, the triangular cap is larger than the cover 82 and thus provides for embracing motor assembling members 87 that are outside the chamber 73.

From this construction it will be apparent that the noise of operation of the valve mechanism is greatly minimized by the manner in which the kicker operates in the notch 55, by the cushioning and sound deadening effect provided by the yieldable sleeve 69, by the muffler 70, and by the fact that spaced multiwall thicknesses are provided by the cover 83 and the walls of the cap 86. All of these factors contribute to the end that the windshield cleaner is substantially silent in its operation and hence it does not annoy or distract the minds of the occupants of a motor vehicle in which the cleaner is installed.

Although only one form of the invention has been shown and described in detail, it will be apparent to those skilled in the art that the invention is not so limited, but that various changes may be made therein without departing from the spirit of the invention or the scope of the appended claims.

What is claimed is:

1. A fluid operated windshield cleaner motor provided with a valve compartment, automatic valve mechanism for controlling the operative supply of fluid to the motor, said valve mechanism including an oscillatable valve member having spaced movement limiting portions, means for operating the valve member back and forth, a stop pin disposed on the motor in the path of movement of and between said limiting portions, and a ring of cushioning and sound deadening material loosely mounted upon the stop pin and between said limiting portions for alternate engagement and movement thereby on said stop pin, whereby to silence the arresting action of said valve member at the end of each oscillation thereof.

2. A fluid operated windshield cleaner motor provided with a valve compartment having a fluid supply port and two chamber ports, automatic valve means for connecting the fluid supply port alternately to said chamber ports and opening the unconnected chamber port to the valve compartment, means sealing the compartment to dampen the operating noise of said automatic valve means, said motor provided with an atmospheric passage leading from the sealed compartment to the outside atmosphere, and muffler means for said atmospheric passage.

3. In a fluid operated windshield cleaner motor, a valve mechanism for controlling the flow of fluid to the motor, said valve mechanism including an oscillatable valve member having movement limiting portions thereon, means for operating the valve member, a stop projecting from a portion of the motor into the path of movement of the limiting portions of said valve member, and a cushioning ring disposed loosely upon the stop for alternate engagement by the limiting portions whereby movement of said limiting portions against the cushion imparts a rotary movement to the cushion about said stop, said valve mechanism having a part operable over the loosely disposed cushioning ring to hold the same against displacement from the stop pin.

ERWIN C. HORTON.
HENRY HUEBER.